United States Patent
Sheard et al.

(10) Patent No.: US 11,112,422 B2
(45) Date of Patent: Sep. 7, 2021

(54) INERTIAL NAVIGATION SYSTEM

(71) Applicant: Atlantic Inertial Systems Limited, Plymouth (GB)

(72) Inventors: John Keith Sheard, Plymouth (GB); Nicholas Mark Faulkner, Plymouth (GB)

(73) Assignee: Atlantic Inertial Systems Limited, Plymouth (GB)

( * ) Notice: Subject to any disclaimer, the term of this patent is extended or adjusted under 35 U.S.C. 154(b) by 0 days.

(21) Appl. No.: 15/371,711

(22) Filed: Dec. 7, 2016

(65) Prior Publication Data
US 2017/0160306 A1 Jun. 8, 2017

(30) Foreign Application Priority Data
Dec. 7, 2015 (GB) ...................................... 1521539

(51) Int. Cl.
*F42B 15/01* (2006.01)
*G01C 21/16* (2006.01)
(Continued)

(52) U.S. Cl.
CPC .............. *G01P 13/025* (2013.01); *F41G 7/36* (2013.01); *F42B 15/01* (2013.01); *G01C 21/16* (2013.01); *G01C 25/005* (2013.01); *G05D 1/108* (2013.01)

(58) Field of Classification Search
CPC .... G01C 21/16; G01C 21/165; G01C 25/005; B64G 1/24; B64G 1/244; B64G 1/281;
(Continued)

(56) References Cited

U.S. PATENT DOCUMENTS 5,886,257 A * 3/1999 Gustafson .............. G01C 21/16
244/171
6,389,333 B1 * 5/2002 Hansman ............... G01C 23/00
701/14
(Continued)

FOREIGN PATENT DOCUMENTS

GB 2526508 * 2/2014 ............. G01C 21/16
JP H06229772 8/1995
(Continued)

OTHER PUBLICATIONS

Zheming Wu et al., "Attitude and gyro bias estimation by the rotation of an inertial measurement unit.," Measurement Science and Technology, 26 125102, Oct. 27, 2015.*
(Continued)

*Primary Examiner* — Jeffrey P Aiello
(74) *Attorney, Agent, or Firm* — Getz Balich LLC

(57) ABSTRACT

An inertial measurement system for a spinning projectile includes: a first, roll gyro to be oriented substantially parallel to the spin axis of the projectile; a second gyro and a third gyro with axes arranged with respect to the roll gyro; a controller, arranged to: compute a current projectile attitude from the outputs of the first, second and third gyros, the computed attitude comprising a roll angle, a pitch angle and a yaw angle; calculate a roll angle error; provide the roll angle error as an input to a Kalman filter that outputs a roll angle correction and a roll rate scale factor correction; and apply the calculated roll angle correction and roll rate scale factor correction to the output of the roll gyro.

14 Claims, 2 Drawing Sheets

(51) Int. Cl.
  *G01P 13/02* (2006.01)
  *G05D 1/10* (2006.01)
  *G01C 25/00* (2006.01)
  *F41G 7/36* (2006.01)
(58) Field of Classification Search
  CPC ... B64G 1/36; G01S 19/53; F41G 7/36; F42B 15/01; F42B 10/26; G01P 13/025; G05D 1/108
  USPC ............. 244/3.15, 3.21, 3.23; 701/3, 500; 702/150, 94, 104, 141–142, 182, 189; 73/510
  See application file for complete search history.

(56) References Cited

U.S. PATENT DOCUMENTS

| | | | |
|---|---|---|---|
| 8,047,070 | B2 | 11/2011 | Tyree |
| 8,768,647 | B1 | 7/2014 | Zaki et al. |
| 9,170,105 | B1 | 10/2015 | Goodzeit et al. |
| 9,235,657 | B1* | 1/2016 | Wenzel ............... G06F 30/13 |
| 2005/0133671 | A1* | 6/2005 | Wang ................. B64G 1/281 244/170 |
| 2005/0143873 | A1* | 6/2005 | Wilson ............. G05B 23/0227 701/8 |
| 2005/0217127 | A1* | 10/2005 | Hermann ............... G01C 9/00 33/365 |
| 2006/0169833 | A1* | 8/2006 | Lamorlette ........... F41G 7/346 244/3.2 |
| 2006/0186274 | A1* | 8/2006 | Wang ................. B64G 1/281 244/158.4 |
| 2007/0023579 | A1* | 2/2007 | Wang ................. B64G 1/281 244/158.6 |
| 2007/0032951 | A1* | 2/2007 | Tanenhaus ........... G01C 21/16 702/151 |
| 2009/0326851 | A1* | 12/2009 | Tanenhaus ........... G01C 21/16 702/96 |
| 2011/0198435 | A1 | 8/2011 | Guibout et al. |
| 2012/0065883 | A1* | 3/2012 | Williamson ......... G01C 21/165 701/501 |
| 2012/0104150 | A1* | 5/2012 | Elgersma ........... G01C 21/165 244/3.21 |
| 2012/0245844 | A1* | 9/2012 | Lommel ............... G06T 7/593 701/448 |
| 2013/0018582 | A1* | 1/2013 | Miller ................. G01C 17/38 701/501 |
| 2014/0326824 | A1* | 11/2014 | Larsson ............... F42B 10/64 244/3.21 |
| 2015/0177020 | A1 | 6/2015 | Dong et al. |
| 2015/0338449 | A1* | 11/2015 | Cheded ............... G01R 31/50 702/185 |
| 2016/0178371 | A1* | 6/2016 | Morrison .......... G01R 33/0035 702/95 |
| 2016/0214742 | A1* | 7/2016 | Carroll ................ B64G 1/66 |
| 2016/0349026 | A1* | 12/2016 | Fairfax ................ F41G 7/36 |
| 2017/0350988 | A1* | 12/2017 | Nakamura .......... G01S 13/84 |

FOREIGN PATENT DOCUMENTS

| | | |
|---|---|---|
| JP | 2004239643 A | 8/2004 |
| WO | 2015128610 A1 | 9/2015 |

OTHER PUBLICATIONS

J.S. Bird, "Inertial Sensor Performance Requirements for a Long Range Artillery Rocket", Defense Research Establishment Ottawa, Technical Note 93-13, Apr. 1993.
Michael J. Wilson, "Attitude Determination with Magnetometers for Gun-Launched Munitions", Army Research Laboratory, Aug. 2004.
Thomas E. Harkins, "On the Viability of Magnetometer-Based Projectile Orientation Measurements", Army Research Laboratory, Nov. 2007.
Fairfax et al. "Position Estimation for Projectiles Using Low-Cost Sensors and Flight Dynamics", Army Research Laboratory, Apr. 2012.
EP search report for EP16201730.5 dated Apr. 7, 2017.
JP office action for JP2016-237348 dated Sep. 8, 2020.

\* cited by examiner

Fig. 1A
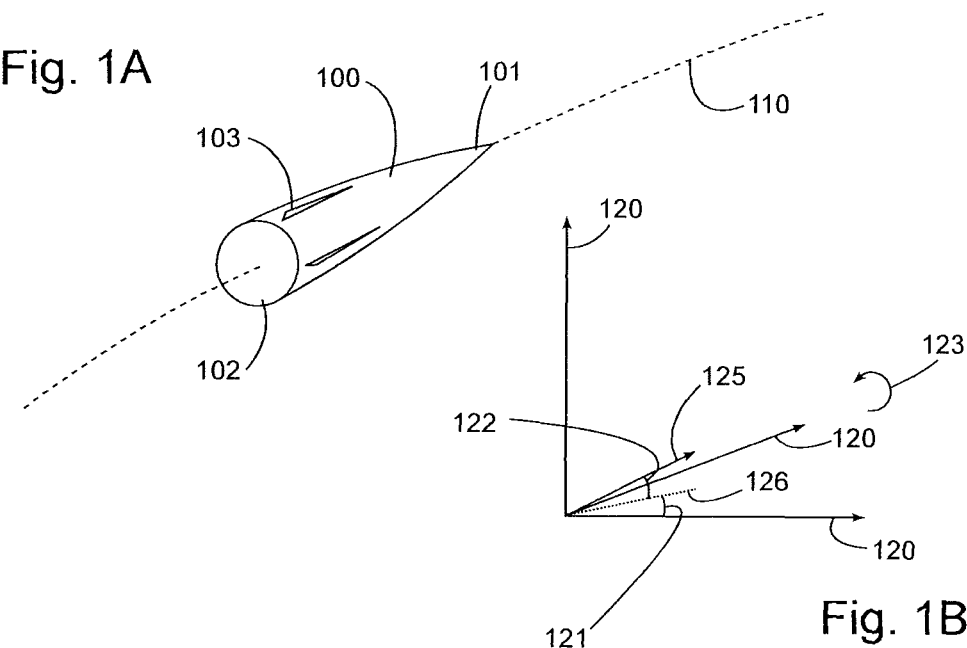
Fig. 1B
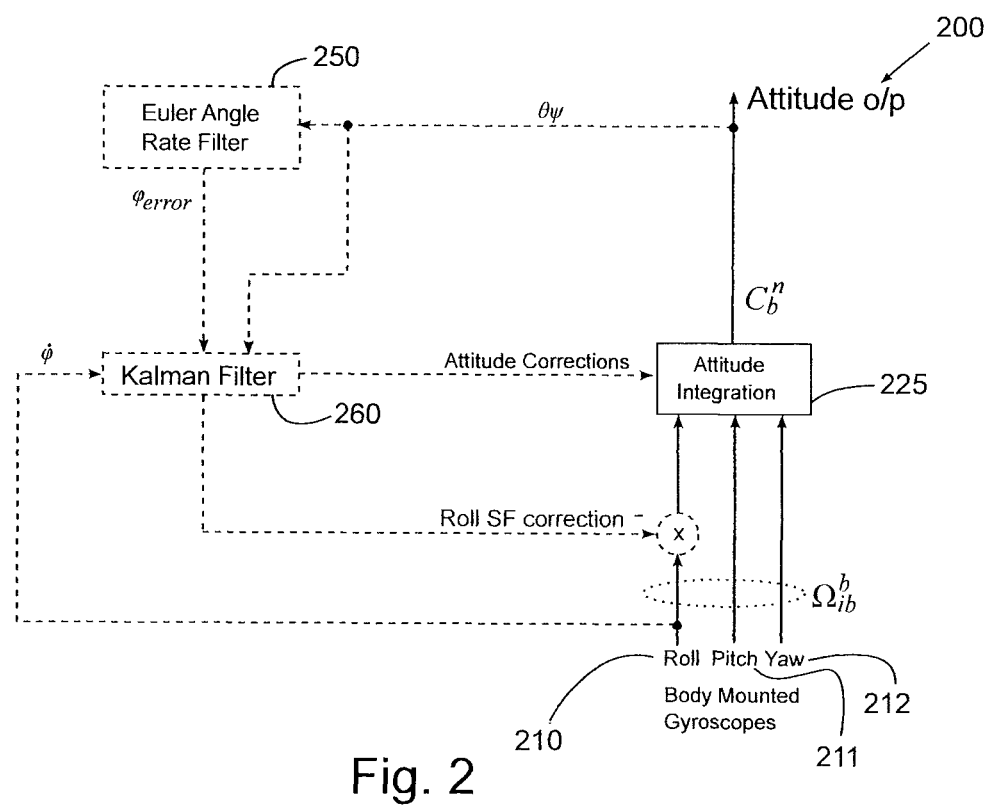
Fig. 2

INERTIAL NAVIGATION SYSTEM

This application claims priority to Great Britain Appln. No. 1521539.5 filed Dec. 7, 2015, which application is hereby incorporated by reference.

BACKGROUND OF THE INVENTION

1. Technical Field

This disclosure relates to inertial navigation systems, in particular those used for projectiles e.g. guided rockets. Inertial navigation systems can be used on guided projectiles to provide position information which can in turn be used to correct the projectile's course to keep it on target.

2. Background Information

Navigation systems can use a variety of different sensors to detect changes to the motion and orientation of an object. For example accelerometers, gyros and magnetometers are often used. Accelerometers detect applied force, gyros detect rotation rates and magnetometers detect the Earth's magnetic field and so can be used to determine absolute orientation.

Inertial navigation systems, based on accelerometers and gyroscopes, can be used either on their own or together with other navigation systems such as GPS. Navigation/guidance of rockets and other munitions is often based on the use of micro-electro-mechanical (MEMS) sensors due to their small size and low-cost. The accuracy of these sensors is relatively poor and not sufficient to meet typical navigation requirements unless external sensors are used to estimate and correct the inertial sensor errors. Using additional aiding sensors in this way is the basis of what is known as 'integrated navigation'.

Integrated navigation is usually based on an algorithmic technique known as Kalman Filtering, a process which blends data from the inertial sensors and external aiding sensors in an optimal way. For this technique to operate robustly, navigation errors must be maintained within certain limits at all times else the linearity assumptions on which the Kalman filter is founded will not be valid and the integrated navigation solution may become grossly inaccurate. It is desirable to avoid this situation by constraining navigation error growth during projectile flight.

When considering navigation Kalman filtering for applications involving rockets, missiles and other rotating platforms, initialising and maintaining an accurate roll (bank) angle presents the biggest challenge. An analysis of the problems associated with the use of inertial guidance technology in such applications is provided by J. S. Bird in "Inertial Sensor Performance Requirements for a Long Range Artillery Rocket" (DTIC ADA279936), with the conclusion that the roll gyro scale factor accuracy is critical and needs to be less than 5 parts-per-million (ppm).

Unfortunately, inexpensive low grade MEMS gyroscopes have a scale factor error of several thousand ppm. Using a gyroscope with a scale factor accuracy of less than 5 ppm would not be practical in terms of cost. Therefore there is a need for a system that can achieve the desired accuracy using inexpensive sensors with much lower scale factor accuracy.

The errors in gyroscope sensors are broadly divided into bias errors and scale factor errors. Although these and other errors are measured and removed as part of a factory calibration process, there will always be residual errors present when the sensors are actually used. These arise for a variety of reasons such as temperature and humidity changes, as well as other physical stresses affecting the unit. In general these errors may be different each time the unit is switched on.

As discussed in the above-referenced paper by J. S. Bird, in strapdown inertial navigation systems (i.e. those in which the inertial sensors are fixed to the body of the airframe as opposed to those in which the sensors are mounted on a gimballed platform that is free to rotate and so remain level at all times), one of the biggest problems comes from high roll rates. Typically roll rates for ballistic projectiles may be of the order of 10-20 full rotations per second, i.e. rotation rates of the order of a few thousand degrees per second. Therefore with a typical roll rate scale factor error of 1000 ppm, the roll angle (bank angle) calculated from this gyro would accumulate an error of a few degrees per second. For a typical projectile range of 30 to 60 km and a typical flight time of 1 to 2 minutes, this error quickly mounts up to be unacceptable.

Gyro bias error can readily be compensated immediately prior to use by averaging a series of readings while the gyro is known to be in a non-rotating state, e.g. prior to launch in the case of a projectile such as a rocket or missile. However, the scale factor error is rate-dependent and may not be measured and corrected whilst stationary. This suggests the need for a scale factor error correction process which operates in-flight, in a wholly self-contained fashion. This disclosure details such a process.

Alternative techniques which have been used in attempts to maintain roll accuracy include the use of non-inertial sensor aiding such as magnetometer, light sensor, GPS and/or thermopiles. These approaches add complexity and cost and introduce additional performance constraints. See for example "Attitude Determination with Magnetometers for un-Launched Munitions", M. J. Wilson, DTIC ADA425992; and "On the Viability of Magnetometer-Based Projectile Orientation Measurements", T. E. Harkins, DTIC ADA474475.

"Position Estimation for Projectiles Using Low-cost Sensors and Flight Dynamics" by L. D. Fairfax and F. E. Fresconi (DTIC ADA560811) describes another solution to this problem for gun-launched mortars which relies upon a multi-state Extended Kalman Filter to estimate position and velocity, but roll angle is determined via additional attitude aiding. This technique is applied to an application with a more benign roll rate profile than a typical artillery rocket.

U.S. Pat. No. 8,047,070 describes a process for estimating the roll angle of a gun-launched projectile. U.S. Pat. No. 8,047,070 uses body angular rate data as its measurements, as opposed to derived Euler angles. It also does not estimate or correct the roll rate scale factor error and it does not operate to preserve elevation and heading accuracy.

SUMMARY OF THE DISCLOSURE

According to this disclosure there is provided an inertial measurement system for a spinning projectile comprising: a first, roll gyro to be oriented substantially parallel to the spin axis of the projectile; a second gyro and a third gyro with axes arranged with respect to the roll gyro such that they define a three dimensional coordinate system; a controller, arranged to: compute a current projectile attitude from the outputs of the first, second and third gyros, the computed attitude comprising a roll angle, a pitch angle and a yaw angle; calculate a roll angle error based on the difference between the computed pitch and yaw angles and expected pitch and yaw angles; provide the roll angle error as an input to a Kalman filter that outputs a roll angle correction and a roll rate scale factor correction; and apply the calculated roll angle correction and roll rate scale factor correction to the output of the roll gyro; wherein the Kalman filter models roll angle error as a function of roll rate and one or more wind variables.

This system provides improved calibration of the roll axis rate gyro scale factor, e.g. of an Inertial Measurement Unit (IMU) fitted to a rolling projectile. As discussed above, the errors in the roll rate measurement are the most significant source of error in high roll rate navigation systems. Earlier systems have struggled to cope with the high roll rates that are present in the earliest phase of flight, i.e. immediately after launch, and attempts have been made to mitigate these effects. For example one possibility could be to employ an intermediate attitude reset function to reset the attitude at some point in time after the initial high roll rate has reduced to more manageable levels. However, such an attitude reset function would be reliant on the presence of linear accelerometers to provide measurements of the current velocity. The system according to this disclosure does not require any such attitude reset and can instead be operated right from launch, providing good roll rate correction even during the high roll rate phase immediately after launch.

In particular, existing systems that use Kalman filters have struggled to achieve stability in the filter due to the high roll rates and the rapid accumulation of roll angle error. The process described here uses a separate process (an Euler angle filter) to calculate an estimate of the roll angle error without the use of the Kalman filter. This process is described in United Kingdom patent application number GB 1403426.8. It has been recognised that this roll angle error measurement can then be provided as an input to the Kalman filter which can then operate in a stable manner and can optimise the filter gain(s) to provide an improved estimate of roll rate scale factor error. The Kalman filter uses time-varying gains and results in more accurate calculations of roll angle error and roll rate scale factor error under a wide range of operating conditions. In particular, it has been recognised that the filter can be configured to estimate and correct for crosswind effects which would otherwise significantly degrade performance.

This process is an improvement on previous designs in that tailored Kalman Filtering techniques can be employed to derive maximum benefit from the Bank (roll) angle error observation process. The benefits include that, whereas existing designs are tuned for specific trajectories, with this architecture the process responds in real time to the trajectory characteristics and so can accommodate a broader range of different missions. The attitude angle and the roll axis scale factor errors exhibit smaller and shorter deviations using this implementation. A further benefit is that the Kalman filter provides a framework in which the perturbing effect of crosswinds can be estimated and corrected. This has the potential to greatly improve performance as wind effects may be very significant under certain flight conditions.

While the roll angle error may be calculated based on the difference between actual angles and expected angles, in preferred examples it is based on the difference between the calculated angular rates (i.e. rates of change of yaw and pitch angles) and the expected angular rates. As these calculations are performed at regular time intervals, these are essentially equivalents.

In some preferred examples, the projectile is a longitudinal projectile and the spin axis is the longitudinal axis.

It will be appreciated that this disclosure relates to any platform where there is some spinning motion for at least part of the mission. It does not have to be spinning all the time. These platforms may be spin-stabilised (i.e. the spin is deliberately introduced to provide stability, such as is the case with artillery shells for example). Conversely, the spin may be incidental, for example introduced as a side effect of the way the rocket motor works. These latter platforms may have fins and can be more stable than artillery shells, but they still spin, albeit at lower rates.

Preferably the Kalman filter models the roll angle error as having a component correlated with roll rate and thus associated with the underlying gyro scale factor, and a separate component correlated with wind effects. The Kalman filter may model the roll angle error as having a component proportional to roll rate and a separate component proportional to wind effects.

In general, the presence of in-flight crosswinds will affect the accuracy of the roll angle/scale factor correction process as it will generally produce changes in computed heading and pitch angle that are indistinguishable from similar changes arising due to roll angle error alone. However, in many applications the rotation rate of the platform is variable (for example the roll rate may reduce during flight due to friction effects with air, as is the case for a projectile launched from a rifled barrel for instance) and the underlying roll rate scale factor produces error effects which are correlated with the roll rate. In contrast, the effect of wind is generally relatively constant, particularly over a short (e.g. 1-2 minute) flight time.

Preferably the Kalman filter is configured such that in use it iteratively updates the model parameters. Using observations made over time, the Kalman Filter can isolate the correlated and non-correlated error contributions and thus estimate and correct for wind effects (e.g. crosswind effects).

It will be appreciated that while the Kalman Filter may be configured to model the wind in three dimensions, it is particularly crosswinds which are important. The projectile will generally have a lot of energy/momentum in the longitudinal direction and axial winds will generally not affect the projectile attitude significantly. Conversely, crosswinds will generally perturb the attitude (particularly the heading) and therefore the Kalman Filter may in some examples be configured to model crosswinds. This may be done by modelling wind in only two dimensions (modelling perturbations to both heading and elevation) or in one dimension (modelling perturbations only affecting the heading).

In some examples the controller may be arranged to supply meteorological data to the filter as an initial condition for the Kalman filter. In this way the process can exploit prior knowledge of meteorological conditions when such data is available. This may be provided as an a priori estimate of crosswind velocity which is stored within the filter and the filter then estimates and corrects for the error in this a priori estimate.

The controller may be arranged to apply the roll rate scale factor correction directly to the roll gyro output, and may be arranged to apply the roll angle correction to an attitude integration unit.

Preferably the roll gyro is a MEMS (Micro Electro Mechanical System) gyro. All three gyros may be MEMS gyros. In some examples, the roll gyros may be a MEMS gyro with a rate scale factor error of greater than 100 parts per million. In some examples, the rate scale factor error may be greater than 1000 parts per million. As the scale factor error can be corrected by the feedback system, a high scale factor error can be tolerated. Thus lower quality, less expensive components can be used, reducing the cost of the system while maintaining excellent accuracy. In particular these inexpensive gyros can be used with a Kalman filter for ultimately attaining improved processing and accuracy.

In some examples, the expected values for pitch and yaw angles as a function of time may correspond to those expected from planar ballistic flight. Planar ballistic flight refers to the trajectory that results when the only significant forces acting on the airframe are gravity and aerodynamic drag acting in the longitudinal axis. In general, there will always be other forces present. Some of these will either be small or will have a neutral deflection effect due to the rolling motion of the airframe. Others, such as the crosswind effects can be compensated by the Kalman filter in the subsequent stage of correction. However, for the purposes of the initial Euler angle filter, the ballistic flight trajectory will be considered to be substantially in one plane and during such flight the heading angle (yaw angle) is not expected to change for the duration of that flight. At the same time, the elevation angle (pitch angle) is expected to decrease at a known rate throughout the flight as a spinning projectile (which is typically longitudinal) tends to orientate itself at a tangent to its trajectory. Note that this flight may be one phase of a more complex flight plan, with subsequent phases involving corrective manoeuvres that deviate from the planar trajectory.

Using planar ballistic heading and elevation angles for the expected yaw and pitch angles means that the system treats any deviation in calculated yaw and pitch angles from the expected ballistic trajectory to have resulted from errors in the roll angle calculation. The Euler angle filter uses this assumption to generate the roll angle error that is provided to the Kalman filter for further processing.

Preferably the roll angle error is calculated as the angle whose tangent is the ratio of the rate of change of the calculated yaw angle to the rate of change of the calculated pitch angle. In some examples, the ratio may include a negative sign due to the geometrical definitions. For example, the roll angle error may be calculated as the angle whose tangent is the ratio of the rate of change of the calculated yaw angle to the negative of the rate of change of the calculated pitch angle.

The inertial measurement system may further comprise a low pass filter arranged to filter out high frequency components of changes in the yaw angle and the pitch angle before calculation of the rate of change of the yaw angle and the rate of change of the pitch angle. A time constant of the low pass filter may be increased at high roll rates and decreased at low roll rates.

In the case of projectiles that do not follow a purely planar trajectory, but still follow a predictable trajectory, the predicted yaw and pitch angles (or angle rates) throughout the flight can still be used as reference values. One such example would be a spin-stabilised artillery shell which spins at very high rate (greater than 100 revolutions per second), which results in many forces which act to deflect the course of the shell. Any deviation of yaw and pitch angles (or angle rates) from the reference values can be taken to have resulted from errors in the roll angle calculation. In such cases, pre-computed flight trajectory information is loaded into the on-board navigation system. This may be in the form of a flight path aiding table (FPAT) or similar. For many projectiles/munitions, the likely flight trajectory from launch point to target is established during a pre-launch mission planning process. This process usually yields tabular data describing the expected position, velocity and attitude of the projectile as a function of flight time (the FPAT). This data may be transferred to the projectile and used during flight for various purposes related to navigation/guidance. The expected yaw and pitch values can be continuously looked up during the flight as required. Therefore the expected values for pitch and yaw angles as a function of time may be taken from pre-computed flight trajectory information which may be non-planar. Angle rates, if used, may be included in this information or calculated from it.

The process described here to correct the roll axis gyro scale factor error and roll angle correction is complementary to other systems and can be used in combination with them, or it can be used as a standalone system.

As discussed above, the system may be used with either simple or complex systems, with the roll scale factor error correction either being the sole feedback element or being complementary to other corrections and/or feedback mechanisms. However, in some preferred examples, the inertial measurement system has no linear accelerometers. The hardware (i.e. the IMU) required for such implementations is less expensive than more complex IMUs such as six degree of freedom IMUs. In other preferred examples, the system has only angular rate measurement devices, e.g. gyros.

In some examples, the roll angle correction and roll scale factor correction may only be applied prior to any guidance action being initiated.

According to another aspect, this disclosure provides a method of correcting roll angle in an inertial measurement system for a spinning projectile, comprising: computing a current projectile attitude comprising a roll angle, a pitch angle and a yaw angle; calculating a roll angle error based on the difference between the computed pitch and yaw angles and expected pitch and yaw angles; providing the roll angle error as an input to a Kalman filter that outputs a roll angle correction and a roll rate scale factor correction; and applying the calculated roll angle correction and roll rate scale factor correction to the output of a roll gyro; wherein the Kalman filter models roll angle error as a function of roll rate and one or more wind variables.

According to another aspect, this disclosure provides a method of correcting roll angle in an inertial navigation system for a longitudinal projectile, comprising: computing a current projectile attitude comprising a roll angle, a pitch angle and a yaw angle; calculating the rates of change of the pitch angle and yaw angle and comparing these with the expected rates of change; using the result of this comparison to calculate a roll angle error and providing this as an input to a Kalman filter that outputs a roll angle correction and a roll rate scale factor correction; and applying the calculated roll angle correction to the computed attitude and the roll rate scale factor correction to the roll gyro output; wherein the Kalman filter models roll angle error as a function of roll rate and one or more wind variables.

All of the preferred features described above in relation to the system are equally applicable to the corresponding methods. In preferred examples, the method and system are particularly applicable to high roll rate projectiles, i.e. projectiles intended to be imparted with a high roll rate during flight, e.g. greater than 5, greater than 10 or greater than 15 revolutions per second.

BRIEF DESCRIPTION OF THE DRAWINGS

One or more non-limiting examples will now be described, by way of example only, and with reference to the accompanying figures in which:

FIG. 1A shows a projectile in flight;
FIG. 1B illustrates the attitude of the projectile;
FIG. 2 shows an inertial navigation system.

DETAILED DESCRIPTION OF THE INVENTION

Figure 3:
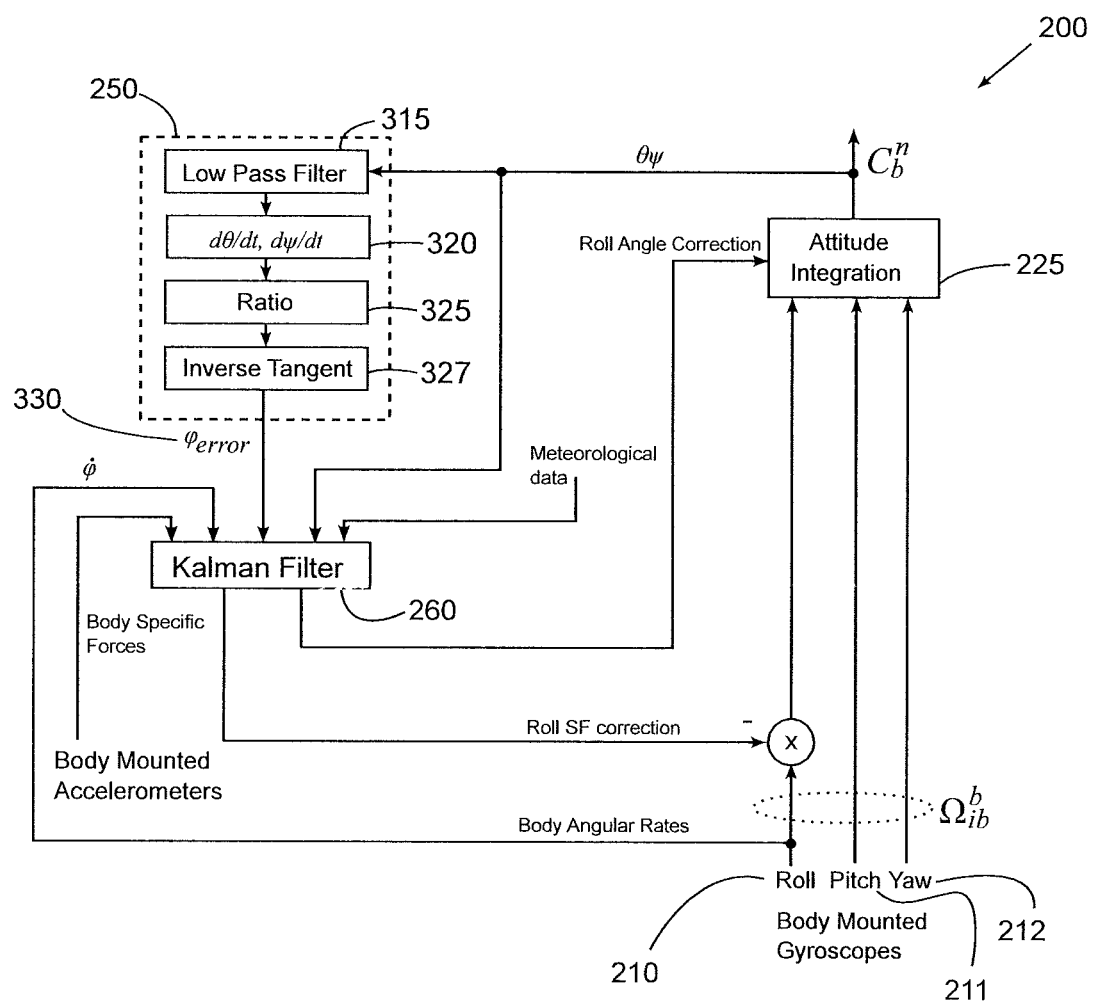
FIG. 3 shows a roll control process in detail.

The following describes a method to perform in-flight calibration of (i.e. to measure and correct) the roll axis rate gyro scale factor for an Inertial Measurement Unit (IMU) fitted to a rolling projectile 100.

FIG. 1A illustrates a rocket 100 in flight. Its trajectory 110 is shown in broken line. The rocket 100 has a nose 101, tail 102 with fins 103. Fins 103 may be static or they may be movable so as to provide directional control so as to alter the flight path of the rocket 100.

In inertial navigation terminology, the orientation of a body/platform is described in terms of the three Euler angles 'heading, 'elevation' and 'bank'. The equivalent terms 'yaw', 'pitch' and 'roll' are also in use. The body orientation is generally referred to using the term 'attitude'. Although strictly speaking the term 'attitude' refers only to the elevation and bank angles, in this document, the more general definition is used. Therefore in this document, the term 'attitude' refers to all three of heading, elevation and bank (or equivalently yaw, pitch and roll).

In FIG. 1B the attitude 125 of the rocket 100 is shown with respect to the axes 120 of the navigation frame of reference. The projection of the attitude 125 onto the horizontal plane is shown by dotted line 126. The heading or yaw angle of the rocket is shown by the angle 121, the elevation or pitch angle of the rocket is shown by the angle 122 and the bank or roll angle of the rocket about its longitudinal axis is indicated by arrow 123. The rocket 100 is rotating anti-clockwise when viewed from behind as shown.

FIG. 2 illustrates in a general way how the roll angle correction and scale factor error estimation processes fit in with the normal attitude integration process. The raw inputs of the inertial navigation system 200 are the roll, pitch and yaw rates from the body mounted gyroscopes indicated at 210, 211 and 212 respectively.

In a standard navigation system (ignoring for the moment the additional roll control functions of this example), the gyroscope outputs 210, 211, 212 are integrated by the attitude integration function 225.

FIG. 2 indicates the overall architecture, involving two additional processes 250, 260 in conjunction with the normal Attitude Integration function 225 which exists with a standard inertial Strapdown process (the standard process being illustrated with solid lines. The first additional process (Euler Angle Rate Filter 250) monitors the Euler angles generated by the Attitude integration function 225 and estimates a value for the Bank angle error; this estimate is passed (along with the attitude information) to a Kalman Filter 260 which derives corrections to be applied to the Bank angle and Roll rate scale factor. The roll angle correction is applied to the attitude integration unit 225 and the roll scale factor correction is applied to the output of roll gyro 210.

As mentioned earlier, this example does not require linear accelerometers in order to function. However, in more complex systems where body mounted linear accelerometers are provided, the attitude integration function may also take into account other corrections such as Earth Rate Correction, Transport Rate Correction, Coriolis & Centripetal Correction and Gravity Correction. Each of these corrections are based on the position and velocity data derived from the accelerometers. These corrections and the associated transformations between reference frames are all well-known and understood and will therefore not be described further here. However, to aid understanding, the symbols in FIGS. 2 and 3 have the following meanings:

$C_b^n$ Transformation matrix—body to navigation reference frames
$\Omega_{ib}^b$ Body rotation rate in the body frame of reference
$\theta$ Inertially derived Elevation (pitch) angle
$\varphi$ Inertially derived Bank (roll) angle
$\Psi$ Inertially derived Heading (yaw) angle
$\varphi_{error}$ Bank (roll) angle error estimate
$\dot{\varphi}$ Inertially measured roll rate $$\frac{\partial \theta}{\partial t}$$

Inertially derived Elevation (pitch) angle rate $$\frac{\partial \psi}{\partial t}$$

Inertially derived Heading (yaw) angle rate

The Euler Angle Rate Filter estimation process 250 and Kalman filter 260 are indicated in FIG. 2 in dashed lines, as an addition to the conventional attitude integration function 225 indicated in solid lines. This complete process is suitable for operation during the early flight phase of a surface launched rocket or other high roll-rate projectile, when the roll rates are typically high (e.g. 10 Hz to 20 Hz).

The inertial navigation system 200 of FIG. 2 combines two of the outputs from the attitude integration function (Elevation $\theta$ and Heading $\psi$ angles) to estimate the prevailing roll angle error. The Kalman filter 260 combines this error estimate with the outputs of the attitude integration function 225 and the roll rate to compute optimal estimates for the roll angle error, which is then fed back to the attitude integration function, and the roll gyro scale factor error, which is then available to correct the roll axis rate measurement.

FIG. 3 shows the inertial navigation system 200 in more detail.

The detail of the Euler Angle Rate Filter function 250 is indicated in FIG. 3 by the dashed line. The parameter $\varphi_{error}$ 330 is derived from the Elevation and Heading Euler angles ($\theta$ and $\Psi$). The Euler Angle Rate Filter 250 uses the Elevation and Heading angles calculated by the Attitude Integration function 225, and applies successively a Low Pass Filter 315, a time derivative 320, a ratio function 325 and an inverse Tangent function 327 to estimate the instantaneous Bank angle error 330.

More specifically the Euler Angle Rate Filter 250 operates in the following manner: $\varphi_{error}$ is derived as a provisional estimate of the correction to the existing Bank (roll) angle, the correction being the ratio between the Heading (yaw) rate and the Elevation (pitch) rate as calculated from the attitude integration module 225. In other words, the provisional Bank angle error is the angle having the ratio of Heading (yaw) rate to Elevation (pitch) rate as its trigonometric tangent. This calculation is based on the assumption that the rocket trajectory is purely planar i.e. it maintains the same fixed heading throughout the flight. The elevation angle in such flight is also expected to decrease at a constant, predictable rate. This calculation is based on the assumption that any deviation in Heading (yaw) angle must have arisen through errors in the Bank (roll) angle calculation. This technique may however be extended to applications involving non-planar trajectories (e.g. spinning artillery shells) using prior knowledge of the expected heading profile. In such cases, a similar calculation can be made using the deviation of the calculated Heading (yaw) angle compared with the expected/predicted Heading (yaw) angle and assuming that any such deviations have arisen through errors in the Bank (roll) calculation.

The Heading (yaw) and Elevation (pitch) rates are continuously calculated as the time derivative of low-pass filtered forms of the Heading (yaw) and Elevation (pitch) angles from the attitude integration module 225.

Referring to FIG. 3, the Heading (yaw, psi) and Elevation (pitch, theta) angles are extracted from the attitude integration module 225 and fed into low pass filter 315 which filters out unwanted high frequency components. Time derivatives of Elevation (pitch) angle, $$\frac{\partial \theta}{\partial t}$$

and Heading (yaw) angle, $$\frac{\partial \psi}{\partial t}$$

are calculated by time-derivative module 320 and the ratio of these time derivatives is calculated in Ratio module 325. The ratio is output as the provisional roll angle error ($\varphi_{error}$) 330.

The provisional roll angle error 330 is a value that is a sufficiently stable measurement of the system's state that the Kalman filter 260 can be used to improve upon it.

This example exploits the capability of the Euler angle filter 250 to determine the growth in Bank angle error ($\varphi\_error$) which arises from the combination of Roll rate and Roll axis gyro scale factor error, and wind effects. Whereas in previous systems $\varphi\_error$ has been used to compute Bank angle and Roll axis gyro scale factor corrections using filter gains that are substantially fixed or having a simple relationship with roll rate, in this case the Kalman Filter 260 calculates time varying gains. This approach provides several benefits; Bank angle and Roll axis gyro scale factor corrections are calculated more accurately and more rapidly under a wide range of operating conditions, and the filter 260 can be configured to estimate and correct for crosswind effects which would otherwise significantly degrade performance.

As discussed above, the presence of in-flight crosswinds will affect the accuracy of the roll angle/scale factor correction process as it will generally produce changes in computed Heading and Pitch angle that are indistinguishable from similar changes arising due to Roll angle error alone. In many applications the rotation rate of the platform is variable (e.g. the roll rate gradually reduces due to air resistance during the flight) and the underlying Roll rate scale factor produces error effects which are correlated with the roll rate. In contrast, the effect of wind is generally relatively constant. Using observations made over time, the Kalman Filter 260 can isolate the correlated and non-correlated error contributions and thus estimate and correct for crosswind effects.

The Kalman filter 260 uses a model of the relationship between the roll angle error, roll scale factor error and wind effects. Using this model together with measurements (or observations) of the system state, the Kalman filter 260 can transform the roll angle error estimate 330 from the Euler Angle Rate Filter 250 into corrections of Roll rate scale factor and roll angle. Using this model, the Kalman filter 260 is able to isolate and correct for the nuisance effect of crosswinds. By identifying the contribution that the crosswinds make to the roll angle error (by causing deviations in heading and elevation angles), the Kalman filter is able to maintain an estimate of the prevailing crosswind, allowing the remaining roll angle error to be more accurately attributed to the scale factor error of the roll gyroscope, thus improving the accuracy of the gyroscope output, the attitude integration unit 225 and all subsequent navigational processing. Additionally, having identified the effect that crosswinds have had on the roll angle error, the accuracy of the roll angle correction applied directly to the computed attitude solution is maximised.

Although the Kalman filter 260 may use a simple model relying only on the provisional roll rate scale factor estimation 330, it preferably takes more information into account where available. As shown in FIG. 3, The Kalman filter also receives as inputs the roll rate 210 direct from the gyro, the calculated heading and elevation angles (theta and psi) from the attitude integration module 225, body specific forces provided from other body mounted accelerometers (if available) and meteorological data (if available).

Meteorological data may not always be available, but if it is available (e.g. if it can be loaded into the system prior to launch), it can be used as an a priori estimate of the wind effects, e.g. as an a priori estimate of crosswind velocity and can be stored within the filter 260, e.g. as an initial condition. As the filter 260 begins to evolve, it then estimates and corrects for the error in this a priori estimate.

This disclosure is an improvement on previous designs in that tailored Kalman Filtering techniques are employed to derive maximum benefit from the Bank angle error observation process. The benefits are that, whereas existing designs are tuned for specific trajectories, with this architecture the process responds in real time to the trajectory characteristics and so can accommodate a broader range of different missions. The attitude angle and the roll axis scale factor errors exhibit smaller and shorter deviations using this implementation. A key benefit of the examples described here is the ability of the Kalman Filter 620 to estimate and correct for crosswind effects. This has the potential to greatly improve performance as wind effects may be very significant under certain flight conditions.

The processes described here apply improved techniques and achieve improved performance by providing the ability to calibrate the Roll Rate Scale Factor error under prolonged high roll rate conditions and from early in the flight trajectory. The process results in a more accurate and earlier correction to the IMU Roll axis Scale Factor error (especially as the Kalman filter 260 will typically converge rapidly). Additionally this process does not need to rely upon a full navigation solution (e.g. it is not necessarily reliant on linear accelerometers) and can be applied to simpler guidance applications and rate-only IMUs, thus saving on cost and simplifying implementations.

It will be appreciated that the controller may take many forms and may be arranged to receive in any suitable manner inputs from other hardware devices. Specifically, the controller may be arranged to receive the outputs from the gyros and/or accelerometers as well as other data inputs. In embodiments, the controller may include a processor. For example, and without limitation, the controller may include any suitable processor such as a system on a chip or a gate array. The processor may include a single chip or may be a chipset of multiple chips. The controller may be configured to execute a set of programmable instructions for carrying out any of the method disclosed herein (optionally including preferred features thereof). The programmable instructions may be stored on any suitable non-transitory storage medium. Thus the controller may include a microprocessor operably connected to a memory which may be of any suitable form, such as a volatile memory (e.g. Random Access Memory) and/or non-volatile memory (e.g., flash storage, magnetic or optical disk or storage media, etc.). The controller may include an output port that may be operably connected to other system components such that the controller may control other system components (e.g. hardware components such as movable fins for providing directional control).

The invention claimed is:

1. An inertial measurement system for a spinning projectile comprising:
    a first gyro to be oriented substantially parallel to a spin axis of the projectile;
    a second gyro and a third gyro with axes arranged with respect to the first gyro such that they define a three dimensional coordinate system;
    the first gyro, the second gyro and the third gyro each being arranged to produce an output;
    a Kalman filter; and
    a controller, arranged to:
        compute a current projectile attitude from the outputs of the first, second and third gyros, the computed attitude comprising a roll angle, a pitch angle and a yaw angle;
        calculate a roll angle error based on a difference between the computed pitch and yaw angles and expected pitch and yaw angles;
        provide the roll angle error as an input to the Kalman filter that outputs a roll angle correction and a roll rate scale factor correction; and
        apply the calculated roll angle correction and the roll rate scale factor correction to the output of the first gyro;
    wherein the Kalman filter models roll angle error as a function of roll rate having a component correlated with roll rate and a separate component correlated with crosswind effects; and
    wherein using observations made over time, the Kalman filter isolates the component correlated with roll rate and the component correlated with crosswind effects, thereby maintaining an estimate of the prevailing crosswind and using the remaining component correlated with roll rate to calculate the roll rate scale factor correction.

2. The inertial measurement system as claimed in claim 1, wherein the Kalman filter is configured such that in use it iteratively updates the model parameters.

3. The inertial measurement system as claimed in claim 1, wherein the controller is arranged to supply meteorological data to the filter as an initial condition for the Kalman filter.

4. The inertial measurement system as claimed in claim 1, wherein the controller is arranged to apply the roll rate scale factor correction directly to the first gyro output, and is arranged to apply the roll angle correction to an attitude integration unit.

5. The inertial measurement system as claimed in claim 1, wherein the first gyro is a MEMS gyro.

6. The inertial measurement system as claimed in claim 1, wherein the expected pitch and yaw angles as a function of flight time correspond to those expected from planar ballistic flight.

7. The inertial measurement system as claimed in claim 6, wherein the roll angle error is calculated as the angle whose tangent is the ratio of the rate of change of the calculated yaw angle to the rate of change of the calculated pitch angle.

8. The inertial measurement system as claimed in claim 7, further comprising a low pass filter arranged to filter out high frequency components of changes in the yaw angle and the pitch angle before calculation of the rate of change of the yaw angle and the rate of change of the pitch angle.

9. The inertial measurement system as claimed in claim 1, wherein the expected values for pitch and yaw angles as a function of flight time are taken from a pre-computed flight trajectory which may be non-planar.

10. The inertial measurement system as claimed in claim 1, wherein the system has no linear accelerometers.

11. The inertial measurement system as claimed in claim 1, wherein the roll angle correction and roll scale factor correction are only applied prior to any guidance action being initiated.

12. The inertial measurement system as claimed in claim 1, wherein the controller is arranged to calculate the roll angle error based on the difference between the computed pitch angle rate and yaw angle rate and expected pitch and yaw angle rates.

13. A method of correcting roll angle in an inertial measurement system for a spinning projectile, comprising carrying out the following steps on a controller:
    computing a current projectile attitude comprising a roll angle, a pitch angle and a yaw angle;
    calculating a roll angle error based on the difference between the computed pitch and yaw angles and expected pitch and yaw angles;
    providing the roll angle error as an input to a Kalman filter that outputs a roll angle correction and a roll rate scale factor correction; and
    applying the calculated roll angle correction and roll rate scale factor correction to the output of a roll gyro;
    wherein the Kalman filter models roll angle error as a function of roll rate having a component correlated with roll rate and a separate component correlated with crosswind effects; and
    wherein using observations made over time, the Kalman filter isolates the component correlated with roll rate and the component correlated with crosswind effects, thereby maintaining an estimate of the prevailing crosswind and using the remaining component correlated with roll rate to calculate the roll rate scale factor correction.

14. A method of correcting roll angle in an inertial navigation system for a longitudinal projectile, comprising carrying out the following steps on a controller:
    computing a current projectile attitude comprising a roll angle, a pitch angle and a yaw angle;

calculating the rates of change of the pitch angle and yaw angle, using these rates to calculate a roll angle error and providing this as an input to a Kalman filter that outputs a roll angle correction and a roll rate scale factor correction; and applying the calculated roll angle correction to the computed attitude and the roll rate scale factor correction to the roll gyro output;

wherein the Kalman filter models roll angle error as a function of roll rate having a component correlated with roll rate and a separate component correlated with crosswind effects; and wherein using observations made over time, the Kalman filter isolates the component correlated with roll rate and the component correlated with crosswind effects, thereby maintaining an estimate of the prevailing crosswind and using the remaining component correlated with roll rate to calculate the roll rate scale factor correction.

* * * * *